United States Patent
Kato et al.

(10) Patent No.: US 7,759,270 B2
(45) Date of Patent: Jul. 20, 2010

(54) TITANIUM OXIDE SOL AND PROCESS FOR PRODUCING POLYALKYLENE TEREPHTHALATE THEREWITH

(75) Inventors: Jinichiro Kato, Tokyo (JP); Yoshiki Takeda, Okayama (JP); Takafumi Konishi, Hiratsuka (JP)

(73) Assignee: Fuji Titanium Industry Co., Ltd., Osaka-Shi (JP)

( * ) Notice: Subject to any disclaimer, the term of this patent is extended or adjusted under 35 U.S.C. 154(b) by 11 days.

(21) Appl. No.: 11/920,253

(22) PCT Filed: May 11, 2006

(86) PCT No.: PCT/JP2006/309496
§ 371 (c)(1),
(2), (4) Date: Nov. 13, 2007

(87) PCT Pub. No.: WO2006/121121
PCT Pub. Date: Nov. 16, 2006

(65) Prior Publication Data
US 2009/0069529 A1    Mar. 12, 2009

(30) Foreign Application Priority Data
May 12, 2005   (JP) .............................. 2005-139394

(51) Int. Cl.
*B01J 21/00*   (2006.01)

(52) U.S. Cl. ........................ 502/100; 423/609; 423/610; 528/279; 252/363.5

(58) Field of Classification Search ................. 528/271, 528/272, 275, 277, 279, 283, 281; 521/48; 502/100, 102, 103, 104, 108, 109, 113, 117, 502/150, 156, 159, 172, 227, 107; 252/363.5; 423/69, 76, 579, 592.1, 598, 608, 609, 610
See application file for complete search history.

(56) References Cited

U.S. PATENT DOCUMENTS 3,660,078 A * 5/1972 Yamada et al. ................. 423/86
2004/0176564 A1 * 9/2004 Yamamoto et al. .......... 528/286

FOREIGN PATENT DOCUMENTS

| | | |
|---|---|---|
| JP | 10-182152 | 7/1998 |
| JP | 11-130856 | 5/1999 |
| JP | 2000-119383 | 4/2000 |
| JP | 2001-81172 | 3/2001 |
| JP | 2002-542323 | 12/2002 |
| JP | 2006-2068 | 1/2006 |
| WO | WO 00/61657 | 10/2000 |

* cited by examiner

*Primary Examiner*—Ling-Siu Choi
*Assistant Examiner*—Frances Tischler
(74) *Attorney, Agent, or Firm*—Finnegan, Henderson, Farabow, Garrett & Dunner, L.L.P.

(57) ABSTRACT

An environmentally friendly polymerization catalyst for polyalkylene terephthalate which does not use a heavy metal such as antimony, and a method for producing polyalkylene terephthalate using the catalyst. The catalyst for polymerizing a polyalkylene terephthalate is a titanium oxide sol containing an organic solvent as a dispersion medium, the sol has a light transmittance of not less than 50%, the light transmittance being measured by adjusting a concentration of the titanium oxide in the sol to 0.7 g/L and setting an optical path length to 1 cm in a wavelength range of 400 to 800 nm, and the amount of hydroxyl groups per 1 g of titanium oxide is not less than 1.8 mmol.

5 Claims, No Drawings

TITANIUM OXIDE SOL AND PROCESS FOR PRODUCING POLYALKYLENE TEREPHTHALATE THEREWITH

TECHNICAL FIELD

The present invention relates to a catalyst for polymerizing a polyalkylene terephthalate, a polymer obtained by the catalyst and a product of the polymer. More particularly, the present invention relates to an environmentally friendly catalyst using a titanium element and without an antimony element, a high quality polyalkylene terephthalate which is obtained by using the catalyst and has a fine hue, moldability and fusion stability and products of the polyalkylene terephthalate such as fibers, films, moldings and the like.

BACKGROUND ART

Polyalkylene terephthalate represented by polyethylene terephthalate (hereafter referred to as PET for short) is produced by reacting a lower alcohol ester derivative of terephthalic acid or a dicarboxylic acid containing terephthalic acid as a major component with a glycol so as to generate a glycol ester of terephthalic acid and/or an oligomer thereof, and subjecting the oligomer to a polycondensation reaction under high vacuum. In order to further increase the molecular weight, a method in which the obtained polymer is further solid state polymerized in a solid state under a high vacuum or in an inert gas, is also industrially employed.

As a polycondensation catalyst of a PET, antimony catalysts represented by an antimony trioxide have been used for a long time. However, an alternative for the antimony catalysts is desirable from the standpoint of environmental load. A PET using an antimony catalyst has a quality problem in that it is difficult to dye clearly, because a part of antimony becomes antimony black and the polymer becomes dull black. Further, during spinning, antimony black causes contamination around a spinneret and filter clogging, and as a result thread breakage may occur. It is necessary to clean the spinneret and the filter to get rid of these problems, and there has been a productivity problem in that a cleaning cycle becomes short.

In such a situation, there have been some studies of alternative materials of antimony catalysts from a standpoint of environmental issues and improving quality and productivity. In particular, a lot of studies using organic and inorganic compounds including titanium have been conducted.

Patent Document 1 discloses a preferable transparent titanium oxide sol and also discloses that titanium oxide is a fine particle of about 400 to 500 mµ and that optical transparency of titanium oxide sol at a wavelength of 370 to 600 nm is not less than 95%. However, the point where a specific amount of hydroxyl groups is included and the point where there is an effect as a polymerization catalyst for a polyalkylene terephthalate are not disclosed. Further, according to a study by the present inventors, the hydroxyl groups in the titanium oxide disclosed here are less than 1.8 mmol per 1 g of titanium oxide. This is because the production method is different from that of the titanium oxide of the present invention and the titanium oxide particles are simply pulverized or produced by a vapor phase method.

Patent Document 2 discloses a technique using a powdered titanium oxide larger than 10 $m^2/g$ in a specific surface area as a polymerization catalyst of polyester, but does not describe that using a specific titanium oxide sol is effective for a polymerization catalyst. These inorganic titanium compound catalysts are considered better catalysts because their thermal decomposition reactivity are low although they still have higher activity compared with organic titanium compounds. However, there is still a case where the obtained polymer may become stained severely, and to avoid this, using a cobalt compound, which is a bluing agent, has been considered. However, like antimony compounds, cobalt compounds are not necessarily effective for resolving environmental problems and further, and as for the quality of a polymer, there has been a tendency to decrease thermal stability of polymers and clarity of dye materials.

Patent Document 1: JP 10-182152 A
Patent Document 2: JP 2000-119383 A

DISCLOSURE OF THE INVENTION

Problem to be Solved by the Invention

In view of the above-described problems, an object of the present invention is to provide an environmentally friendly polymerization catalyst of polyalkylene terephthalate which does not use a heavy metal such as antimony. Another object of the present invention is to provide a method of producing polyalkylene terephthalate using the catalyst.

Means for Solving the Problem

As a result of intensive investigation, the inventors have discovered that a titanium oxide sol having a specific property has a high activity as a polymerization catalyst for a polyalkylene terephthalate, thereby completing the present invention.

The present invention is as follows:

(1) A titanium oxide sol for a catalyst for polymerizing a polyalkylene terephthalate, wherein the sol contains an organic solvent as a dispersion medium, the titanium oxide in the sol has a concentration of 0.7 g/L, the sol has a light transmittance of not less than 50%, the light transmittance being measured by setting an optical path length to 1 cm in a wavelength range of 400 to 800 nm, and the amount of hydroxyl groups per 1 g of titanium oxide is not less than 1.8 mmol.

(2) The titanium oxide sol according to above item (1), wherein light transmittance is not less than 90%.

(3) The titanium oxide sol according to above item (1) or (2), wherein the organic solvent is a glycol.

(4) The titanium oxide sol according to any one of above items (1) to (3), wherein 1 to 50 mol % of titanium element in the titanium oxide is substituted by an element(s) other than titanium element.

(5) The titanium oxide sol according to above item (4), wherein element(s) other than the titanium element is at least one selected from the group consisting of silicon, zirconium, zinc and germanium.

(6) A production process of a polyalkylene terephthalate comprising the steps of subjecting at least one selected from the group consisting of terephthalic acid, lower alcohol ester derivatives of terephthalic acid, dicarboxylic acids containing terephthalic acid as a major component and derivatives of dicarboxylic acids containing terephthalic acid as a major component to esterification reaction and/or ester-exchange reaction with a diol containing a glycol as a major component so as to generate a glycol ester of terephthalic acid and/or an oligomer thereof, and then subjecting the obtained product to a polycondensation reaction under a vacuum having a pressure of not more than 0.3 kPa to polymerize polyalkylene terephthalate, wherein the titanium oxide sol according to any one of above items (1) to (5) is used as a catalyst for at least one reaction of the esterification reaction, ester-exchange reaction and the polycondensation reaction.

(7) The production process according to above item (6), wherein the titanium oxide sol according to any one of above items (1) to (5) is used as a catalyst for at least the polycondensation reaction.

(8) The production process according to above item (6) or (7), which further comprises the steps of, after completion of the polycondensation reaction, once solidifying the obtained polyalkylene terephthalate and then heating the polyalkylene terephthalate in a solid state to increase the intrinsic viscosity to a level higher than that at the time of the completion of the polycondensation reaction by not less than 0.1 dL/g.

(9) The production process according to any one of above items (6) to (8), wherein a phosphorus compound in an amount of $1 \times 10^{-4}$ to $250 \times 10^{-4}$ parts by weight in terms of phosphorus atom is added per 100 parts by weight of polyalkylene terephthalate, in an optional step in the polymerization, the 100 parts by weight being the amount of the theoretically produced polyalkylene terephthalate.

(10) The production process according to any one of above items (6) to (9), wherein 0.001 to 2 parts by weight of a hindered phenol compound is added per 100 parts by weight of polyalkylene terephthalate, in an optional step in the polymerization, the 100 parts by weight being the amount of the theoretically produced polyalkylene terephthalate.

(11) The production process according to any one of above items (6) to (10), wherein at least one selected from the group consisting of the lower alcohol ester of terephthalic acid, the terephthalic acid and the glycol is one recovered by chemical recycling of polyalkylene terephthalate.

(12) A product made of the polyalkylene terephthalate obtained by the production process according to any one of above items (6) to (11).

Effects of the Invention

The titanium oxide sol according to the present invention is an environmentally friendly catalyst which does not use a heavy metal, particularly antimony which has been used for a long time. The polyesters represented by the polyalkylene terephthalate obtained by the catalyst of the present invention are high quality polymers which excel in hue, moldability, fusion stability and the like, and the polymers can provide high quality products such as fibers, films, moldings and the like.

BEST MODE FOR CARRYING OUT THE INVENTION

The present invention will now be described concretely.

The present inventors studied the development of catalysts, mainly titanium compounds from the aspect of polymerization reactivity during polyalkylene terephthalate polymerization and from the aspect of quality of the obtained polymer to obtain a high quality polymer, which is an object of the present invention, while having a high polymerization activity as compared to known antimony alternatives by using a titanium oxide sol which is highly dispersed in an organic solvent.

The sol in the present invention refers to a form in which coagulated materials of very fine colloidal particles are highly dispersed in the medium by a peptizing process and does not refer to mere dispersions of particles in the form of a powder.

The titanium oxide sol of the present invention is a titanium oxide sol having an organic solvent as a dispersion medium, has a specific light transmittance, and has more than a specific amount of hydroxyl groups per 1 g of titanium oxide.

The titanium oxide according to the present invention cannot be obtained by conventional production methods in which titanium hydroxide particles obtained by hydrolyzing organic or inorganic titanium compounds or titanium oxide which is the product of processing titanium hydroxide particles by heating are, for example, simply broken mechanically in a medium, but can only be obtained after acid-treating a coagulated material, in the form of gel, made of fine colloidal particles of titanium hydroxide obtained under prescribed conditions of hydrolysis, thereby peptizing the coagulated material; dispersing the resulting product to a high dispersion level; mixing the resultant with an organic solvent; and then removing water therefrom. The level of dispersion can be determined by a light transmittance and the amount of hydroxyl groups in the titanium oxide. The light transmittance is not less than 50% in a wavelength range of 400 to 800 nm and the amount of hydroxyl groups is not less than 1.8 mmol per 1 g of titanium oxide.

The titanium oxide sol for a polyalkylene terephthalate polymerization catalyst according to the present invention requires a light transmittance of not less than 50% in the wavelength range of 400 to 800 nm. Here, "not less than 50%" means that the minimum light transmittance in the wavelength range of 400 to 800 nm is not less than 50%. Light transmittance is a value which is measured by setting the optical path length to 1 cm, and setting the amount of the titanium oxide per 1 L of sol to 0.7 g by diluting or concentrating the titanium oxide concentration in the sol. When the light transmittance is not less than 50%, the rate of ester interchange, the rate of esterification and the rate of polycondensation reaction can be increased and the quality of the polymer obtained can also be increased. The light transmittance is preferably 60 to 100%, more preferably 70 to 100%, and most preferably 90 to 100%.

In the present invention, the amount of hydroxyl groups of the titanium oxide is not less than 1.8 mmol/g (not less than 1.8 mmol per 1 g of titanium oxide). Though the upper limit is not restricted, not more than 15 mmol/g is preferable in order to control thermal decomposition. In view of high catalytic activity and preservation stability, 1.8 to 10 mmol/g is preferable and 1.8 to 5 mmol/g is more preferable.

The amount of hydroxyl groups in a known titanium oxide catalyst is less than 1.8 mmol/g.

In the present invention, the titanium oxide sol for the polyalkylene terephthalate polymerization catalyst having excellent catalytic activity can be obtained by meeting the conditions of light transmittance and the amount of hydroxyl groups of the titanium oxide at the same time.

The reason why the titanium oxide sol of the present invention has a high activity as a polymerization catalyst for polyesters is not clear, but it is considered that a lot of active sites for the catalysis are introduced owing to high surface area and at the same time the surface has a structure on which side reactions are not likely to occur.

The titanium sol of the present invention has a form in which titanium oxide is dispersed in an organic solvent. Examples of the solvent which disperses the titanium oxide include alkanes such as pentane, hexane and octane; alkane halides such as methylene chloride and chloroform; aromatic compounds such as toluene and xylene; aliphatic esters such as methyl acetate and ethyl acetate; aliphatic ketones such as acetone and methyl ethyl ketone; alcohols such as methanol, aliphatic glycols and the like. A preferred solvent is glycol which corresponds to the alkylene of the polyalkylene terephthalate to be polymerized, in view of polymerization reactivity and the quality of the polymer. Specifically, when polymerizing PET, ethylene glycol is preferred, when polymerizing polytrimethylene terephthalate, 1,3-propanediol is preferred, and when polymerizing polybutylene terephthalate, 1,4-butanediol is preferred.

The amount of titanium oxide in the titanium oxide sol is not restricted, but is normally preferred to be 0.1 to 70% by weight. In view of reducing by-production of the glycol dimer used in the process of polymerization, the amount of the titanium oxide is preferably 5 to 50% by weight and especially preferably 10 to 30% by weight.

The crystal system of the titanium oxide is not restricted and may be either an amorphous type, anatase type, rutile type or brookite type, and may be a mixture in an arbitrary ratio.

The titanium oxide of the present invention can be obtained by acid-treating the coagulated material, in the form of gel, made of the fine colloidal particles of titanium hydroxide obtained by hydrolyzing an organic or inorganic titanium compound solution under prescribed conditions, thereby peptizing the coagulated material; dispersing the resulting product to a high dispersion level; mixing the resultant with an organic solvent; and then removing water therefrom.

A production process of the titanium oxide sol of the present invention will now be described in more detail.

An organic or inorganic titanium compound which is the source of titanium, includes for example, titanium sulfate, titanium acetate, titanium nitrate, titanium tetrachloride, alkoxides such as titanium isopropoxide, titanium butoxide, etc., and the like. Taking into consideration cost and hydrolysis reactivity, titanium sulfate and titanium tetrachloride are preferable. In addition, another hydrolyzable metal compound may be mixed with the titanium compound at a rate of 1 to 50% by mole, preferably 1 to 30% by mole with respect to titanium metal. In particular, hydrolyzable metal sols of silicon, zirconium, zinc and germanium are preferable in view of increasing catalytic activity.

Hydrolysis of the titanium compound can be performed in water or a water-soluble solvent such as an alcohol, glycol, acetone or methyl ethyl ketone.

In the present invention, it is necessary to add fine particles of orthotitanic acid as reaction nuclei beforehand when conducting hydrolysis. These fine particles of orthotitanic acid are generated by neutralization in which an alkaline solution is added to the titanium compound solution at normal temperature. In this case, the concentration of orthotitanic acid is preferably 20 to 200 g/L in terms of titanium oxide. Sodium hydroxide, potassium hydroxide, sodium carbonate, potassium carbonate, sodium bicarbonate, potassium hydrogen carbonate and the like can be used as the alkali. In particular, sodium hydroxide and potassium hydroxide, which are strong alkali, are preferred. Although the temperature of the liquid rises by neutralization-heat when alkaline solution is added, the temperature is preferably controlled in the range of 0 to 50° C. in order to prevent the generation of metatitanic acid which has low activity.

In the hydrolysis reaction, the amount of orthotitanic acid to be added as the reaction nuclei is preferably 0.5 to 30%, more preferably 1 to 20%, based on the material titanium oxide compound. The preferred concentration of the whole titanium oxide is 50 to 300 g/L, the reaction temperature is normally 0 to 120° C., and the reaction time is normally 10 minutes to 48 hours.

The thus obtained titanium hydroxide is alkali-treated by an alkaline compound such as sodium hydroxide, potassium hydroxide, sodium carbonate, potassium carbonate, sodium bicarbonate or potassium hydrogen carbonate so as to attain a pH of 8 to 14, preferably a pH of 9 to 12, in cases where an inorganic titanium compound such as titanium sulfate or titanium tetrachloride is used as a source material. The temperature of the alkali treatment is normally 0 to 100° C., and the time thereof is normally 10 minutes to 48 hours. By the alkali treatment, impurities such as sulfate ion derived from the source material are removed.

After the alkali treatment, the titanium hydroxide is acid-treated. By the acid treatment, colloidal particles which are coagulated in the form of gel are dispersed (this process is called peptization). As the acid, in addition to inorganic acids such as hydrochloric acid, sulfuric acid, nitric acid and phosphoric acid, organic acids such as oxalic acid, citric acid and lactic acid can be used. The temperature of the acid treatment is normally 0 to 100° C., and the time of the acid treatment is normally 10 minutes to 96 hours. The concentration of the titanium oxide during the acid treatment is 50 to 500 g/L in terms of titanium oxide, and the amount of acid used is preferably 10 to 200 parts by weight per 100 parts by weight of titanium hydroxide in terms of titanium oxide.

Hydrosol can be obtained, after the peptization by the acid treatment, by releasing the aggregation caused by the salt through a desalination process conducted by ion exchange, electrodialysis, ultrafiltration or the like.

Next, by substituting water as a solvent with a dispersion medium such as ethylene glycol, the desired titanium oxide sol can be obtained. The process of substituting the solvent may be either vacuum distillation using an evaporator, a substitution method using an ultrafilter or azeotropic distillation. By the method described above, titanium oxide can be produced having the light transmittance and the amount of hydroxide which are desired in the present invention.

A polyalkylene terephthalate can be produced by using the titanium oxide sol of the present invention.

In the present invention, "polyalkylene terephthalate" means a polymer in which not less than 50 wt %, preferably not less than 70 wt %, more preferably not less than 80 wt %, most preferably not less than 90 wt % of recurring units are alkylene terephthalate units, in view of favorable strength and thermal stability. Specifically, polyalkylene terephthalate includes PET, polytrimethylene terephthalate, polybutylene terephthalate and the like.

In the present invention, as a source monomer which forms the main skeleton of the polyalkylene terephthalate, in addition to terephthalic acid, glycol and diglycol, another monomer may be copolymerized to the extent that the object of the present invention is not inhibited. The monomer to be copolymerized, other than terephthalic acid, esters thereof with a lower alcohol, and glycols, is not restricted and includes diols, dicarboxylic acids, dicarboxylic acid esters, dicarboxylic acid amides, oxycarboxylic acids and the like. Specific examples include diols such as ethylene glycol, 1,2-propanediol, 1,3-propanediol, 1,4-butanediol, 1,5-pentanediol, 1,6-hexandiol and 1,4-cyclohexanedimethanol; carboxylic acids or ester derivatives thereof such as oxalic acid, malonic acid, succinic acid, glutaric acid, adipic acid, isophthalic acid, 2,6-naphthalene dicarboxylic acid, biphenyl dicarboxylic acid, 5-sodiumsulfo isophthalic acid, 5-potassiumsulfo isophthalic acid, 5-lithiumsulfo isophthalic acid, 2-sodium-sulfo terephthalic acid, 2-potassiumsulfo terephthalic acid, 4-sodiumsulfo 2,6-naphthalene dicarboxylic acid, 2-sodium-sulfo-4-hydroxybenzoic acid and tetrabuthyl phosphonium 5-sulfo isophtharate; bis(hydroxyethyl)bisphenol A bis(hydroxyethyl)bisphenol S; oxy acetic acid; hydroxy benzoic acid; and polyols such as polyethylene glycol and polytetramethylene glycol having a molecular weight of 200 to 100,000. If needed, not less than two kinds of ester-forming monomers may be copolymerized. For the purpose of controlling an amount of the molecular weight and terminals of the molecules, monocarboxylic acids such as formic acid, acetic acid, propionic acid and benzoic acid, and lower alcohol esters thereof, and monoalcohols such as hexanol, propanol, benzyl alcohol and phenol, and derivatives thereof can be used.

The terephthalic acid, lower alcohol ester thereof and glycol used in the present invention may be those commercially available or those recovered from products such as bottles, resin moldings, fibers and films by chemical recycle. By using chemically recycled monomers and using catalysts having no environmental stress, the present invention can provide polyalkylene terephthalates and moldings thereof which are environmentally safe, so that the present invention is considered very important for the environment and health.

In the polyalkylene terephthalate produced in the present invention, in view of improved rate of dye uptake and color development during dying, improved fiber-forming stability and unlikeliness to produce powder during transportation, 0.01 to 2 wt %, based on the polyalkylene terephtalate, of diglycol (formula: HOROROH, R corresponds to the alkylene group in the glycol) is preferably copolymerized. If the amount is less than 0.01 wt %, the rate of dye uptake, color development and the unlikeliness to produce powder is insufficient. On the other hand, if the amount is more than 2 wt %, deterioration of the fiber-forming stability and light resistance occurs owing to the decrease in thermal stability. The amount is preferably 0.2 to 1.7 wt %, more preferably 0.2 to 1.0 wt %.

In the present invention, polyalkylene terephthalate may contain 0.2 to 3 wt %, based on the weight of the polyalkylene terephthalate, of total amount of cyclic oligomer composed of alkylene terephthalate units or linear oligomer composed of linearly bound alkylene terephthalate units. These oligomers are by-products produced during the polymerization of polyalkylene terephthalate. If the amount of these oligomers exceeds 3% by weight, they are precipitated during molding, so that the process stability is deteriorated. If the amount is less than 0.2% by weight, dye affinity is slightly decreased. The amount is preferably 0.7 to 2.8 wt %.

In the present invention, intrinsic viscosity of polyalkylene terephthalate is preferably 0.3 to 1.8 dL/g. If the intrinsic viscosity is less than 0.3 dL/g, the strength and the durability of the obtained molding is low. If the intrinsic viscosity is more than 1.8 dL/g, spinning efficiency tends to decrease by poor ejection and the like because the measurement with a gear pump is not conducted smoothly as a result of too high melt viscosity. More preferably, the intrinsic viscosity is 0.3 to 1.4 dL/g, particularly preferably 0.4 to 1.3 dL/g.

In the present invention, a catalyst residue derived from the titanium oxide sol may exist in the polyalkylene terephthalate. However, it is preferable that the amount thereof be as low as possible. When the amount exceeds 150 ppm with respect to the weight of the polyalkylene terephthalate, hue and melt stability decreases. Normally, the amount is 10 to 120 ppm.

In the present invention, L* value of polyalkylene terephthalate is preferably not less than 70 and b* value is preferably −2 to 10. L* value is an index indicating brightness and if the value is not less than 70, the brightness of dyed goods is remarkably improved. More preferably, L * value is not less than 78, and particularly preferably, not less than 85. b* value is an index indicating yellowness. When b* value is −2 to 10, superior color development after dying is shown. When b* value is less than −2 or not less than 10, the dyed goods become dull.

In the present invention, various kinds of additives, for example, a matting agent such as titanium oxide, heat stabilizer, pigment, dyestuff, antifoaming agent, orthochromatic agent, flame retardant, antioxidant, ultraviolet absorbing agent, infrared absorbing agent, crystalline nucleator, fluorescent brightening agent and the like may be copolymerized or mixed with the polyalkylene terephthalate. When titanium oxide (rutile or anatase type crystalline titanium oxide) is used as a matting agent, the amount of the titanium oxide is preferably 0.01 to 3 wt % based on the polyalkylene terephthalate.

Particularly, in order to increase heat stability, melt stability and whiteness of the polymer, a heat stabilizer or a dye retarder is preferably used. As the heat stabilizer, for example, trivalent or pentavalent phosphorous compounds and hindered phenol type antioxidants are preferred. Pentavalent or trivalent phosphorous compounds include trimethyl phosphate, triethyl phosphate, tributyl phosphate, triphenyl phosphate, trimethyl phosphite, triethyl phosphite, triphenyl phosphite, phosphoric acid, phosphorous acid and the like. Hindered phenol type antioxidants include pentaerythritoltetrakis[3-(3,5-di-tert-butyl-4-hydroxyphenyl)propionate], 1,1,3-tris(2-methyl-4-hydroxy-5-tert-buthylphenyl)butane, 1,3,5-trimethyl-2,4,6-tris(3,5-di-tert-butyl-4-hydroxybenzyl)benzene, 3,9-bis{2-[3-(3-tert-butyl-4-hydroxy-5-methylphenyl)propionyloxy]-1,1-dimethylethyl}-2,4,8,10-tetraoxaspiro[5,5]undecane, 1,3,5-tris(4-tert-butyl-3-hydroxy-2,6-dimethylbenzene)isophthalic acid, triethylglycol-bis[3-(3-tert-butyl-5-methyl-4-hydroxyphenyl)propionate], 1,6-hexandiol-bis[3-(3,5-di-tert-butyl-4-hydroxyphenyl) propionate], 2,2-thio-diethylene-bis[3-(3,5-di-tert-butyl-4-hydroxyphenyl)propionate], octadecyl-[3-(3,5-di-tert-butyl-4-hydroxyphenyl)propionate] and the like. In the case of hindered phenol type antioxidants, 0.001 to 2 parts by weight, preferably 0.001 to 1 parts by weight thereof based on 100 parts by weight of theoretically obtained polyalkylene terephthalate is added, and in the case of phosphorous compounds, $1 \times 10^{-4}$ to $250 \times 10^{-4}$ parts by weight, preferably $10 \times 10^{-4}$ to $80 \times 10^{-4}$ parts by weight thereof in terms of phosphorous atom based on 100 parts by weight of theoretically obtained polyalkylene terephthalate is added.

In order to increase the whiteness of the polymer, 0.1 to 100 ppm of compounds having an absorption maximum in the visible region at a wavelength of 500 to 600 nm may be included. As the specific material of these, dyestuffs represented by anthraquinone dye and diazo dye are preferred. The content is preferably, 1 to 30 ppm.

In the present invention, the polyalkylene terephthalate is produced by using the above-described titanium oxide sol of the present invention as a catalyst of at least one of the esterification reaction, the ester exchange reaction and the polycondensation reaction, in the production process comprising the steps of subjecting terephthalic acid and/or lower alcohol ester derivatives of terephthalic acid, or dicarboxylic acids containing terephthalic acid as a major component and/or derivatives of dicarboxylic acids containing terephthalic acid as a major component, and a glycol to esterification reaction and/or ester-exchange reaction so as to generate a glycol ester of terephthalic acid or an oligomer thereof; and thereafter subjecting the obtained product to polycondensation reaction under a vacuum having a pressure of not more than 0.3 kPa to polymerize polyalkylene terephthalate. The titanium oxide sol of the present invention is preferably used at least for polycondensation reaction.

In the present invention, for the method of producing a glycol ester of terephthalic acid or an oligomer thereof by reacting terephthalic acid, lower alcohol ester of terephthalic acid, dicarboxylic acids containing terephthalic acid as a major component, and derivatives of dicarboxylic acids containing terephthalic acid as a major component with a glycol, known method can be used. This reaction is called an ester exchange reaction when a lower alcohol ester of terephthalic acid is used and is called an esterification reaction when a terephthalic acid is used. Here, lower alcohol ester of terephthalic acid is dimethyl terephthalate, diethyl terephthalate, monomethyl terephthalate and the like. In addition, for carboxylic acids, derivatives of carboxylic acids and diols other than lower alcohol ester of terephthalic acid, terephthalic acid and ethylene glycol, for example, the monomer which was exemplified in the description of above-described monomer source can be used. The monomer, of course, is not restricted only to the above-described monomer exemplified.

The feed ratio of diol comprising mainly ethylene glycol to the sum of terephthalic acid, lower alcohol ester of terephthalic acid, dicarboxylic acids containing terephthalic acid as a major component, and derivatives of dicarboxylic acids containing terephthalic acid as a major component is preferably 1.0 to 3 by mole. When the feed ratio is less than 1.0, the ester exchange reaction is hard to proceed and when the feed ratio is more than 3, the amount of diglycol tends to be too high and the whiteness of the obtained polymer tends to decrease. The feed ratio is more preferably 1.4 to 2.5, and particularly preferably 1.5 to 2.3.

In the ester exchange reaction and the esterification reaction, the catalyst is preferably used to smoothly proceed the reaction, and one or more catalysts from the group consisting of titanium oxide sol of the present invention, calcium acetate, manganese acetate, zinc acetate, lithium acetate, lithium formate, sodium acetate and the like can be used as the catalyst.

The amount of the catalyst is 0.002 to 3 wt % and preferably 0.004 to 0.15 wt % of the sum of the whole carboxylic acids and derivatives thereof used as monomer, because it provides a reaction rate, whiteness of the polymer and thermal stability at the same time. In addition, when the titanium oxide sol of the present invention is used as a catalyst, the amount of titanium oxide is within the above-described range.

The reactions can be conducted at a reaction temperature of about 200 to 230° C. while distilling off alcohol, such as methanol, water and the like which are produced as by-products. The reaction time is usually 2 to 10 hours and preferably 2 to 4 hours. The thus obtained reactant(s) is (are) ethylene glycol ester of terephthalic acid and/or oligomer thereof. The above-described ester exchange reaction and esterification reaction may be conducted successively by dividing into two or more reaction furnaces if needed.

Polyalkylene terephthalate of the present invention can be produced by condensation polymerizing the thus obtained glycol ester of terephthalic acid and/or oligomer thereof.

In the condensation polymerization, a catalyst is preferably added before the polycondensation reaction if needed and the titanium oxide sol of the present invention is added if needed. In addition, 0.001 to 0.2 wt %, preferably 0.003 to 0.15 wt % of titanium alkoxide such as titanium tetrabutoxide and titanium tetraisopropoxide, titanium alkoxide and trivalent or pentavalent phosphorus compound, modified titanium compounds which was reacted with aliphatic or aromatic compounds having 1 to 4 carboxyl group(s), trivalent or pentavalent titanium halide, crystalline particulate titanium oxide and the like based on the sum amount of the whole carboxylic acid and the derivatives thereof may be added. As the catalyst of the polycondensation reaction, the catalyst used in the esterization reaction or ester exchange reaction may be used, or a newly added catalyst may be used. Because the titanium-based catalyst is effective for either ester reaction, ester exchange reaction or polycondensation reaction, if the titanium catalyst is added at the stage of the ester exchange reaction or esterization reaction, polycondensation reaction can be conducted without newly adding the titanium catalyst or can be conducted with a little amount of titanium catalyst if it is added.

Every kind of additive except for catalysts may be added at any stage at the same time or added by being divided into several parts, and preferably, the additive is added as it is before the polycondensation reaction or added as a glycol solution or a glycol dispersion. For example, in the case of phosphate compounds and hindered phenol antioxidants, it is preferable that the addition thereof is after the completion of the ester exchange reaction or the esterization reaction in that the stain of polymer is inhibited most effectively without hindering the ester exchange reaction and esterification reaction. In addition, when the temperature of the reactant is higher than the boiling point of the phosphorus compound used, the predetermined amount of additives cannot be added because they will evaporate if added as is. In this case, it is particularly preferable that the additives are added after dissolving the additives in glycol at a temperature of not less than 50° C. in order to react with glycol, thereby raising the boiling point. By using this method, a desired amount of phosphorus can be added to polyalkylene terephthalate. The concentration of glycol solution is, for example, 0.001 to 10 wt %.

In addition, the compounds having an absorption maximum in the visible region of 500 to 600 nm may be added at any stage, and can be added as is or as a dispersion in a solvent in the same way as above-described. In the case of purchasing the compounds having an absorption maximum in the visible region of 500 to 600 nm as commercially available dye and using them, there is a case that surface-active agents and mineral salts such as a sodium sulfate which help disperse the dyestuff in the dye goods are included. Because these cause a decrease in hue or filter clogging at the fusion molding, it is particularly preferable that they be removed beforehand.

In the polycondensation reaction, after adding a catalyst(s) and increasing the temperature, under a reduced pressure of 0.0001 to 0.3 kPa, the reaction is conducted at a temperature of 25 to 50° C. up to the melting point of the obtained polymer. The additives can be added at any stage. The polymerization time is, while depending on the target intrinsic viscosity, normally 2 to 5 hours. It is necessary to decompress before or at an initial stage of elevating the temperature and remove the most of the excess glycol preferably before the temperature reaches 240° C. If an excess of glycol resides for a long time at a high temperature, the glycols themselves may condense to diglycol and the diglycol may copolymerized into a polymer and the copolymerization ratio of the diglycol will exceed 2 wt %. In the specific method of decompression, it takes 15 to 100 minutes to decrease the pressure from the normal pressure to 0.3 kPa. If the time is not more than 15 minutes, a glycol bumps tends to occur and a vacuum line can be clogged. If the time is more than 100 minutes, a large amount of diglycol is produced. The time is preferably 15 to 60 minutes.

The thus obtained polyalkylene terephthalate is made into chips by the known method and can be used as a source material of fibers, films and moldings.

Although the intrinsic viscosity of the thus obtained polyalkylene terephthalate is normally from about 0.3 to 1.0 dL/g and the object of the present invention can be attained, there are cases where it is difficult to increase the intrinsic viscosity more than 0.75 dL/g. This is because it may be difficult to increase the viscosity because of the thermal decomposition if the reaction temperature is increased in order to increase the intrinsic viscosity. Here, the preferable method of attaining the intrinsic viscosity not less than 0.75 dL/g is to use solid phase polymerization. When solid phase polymerization is used, the intrinsic viscosity can be increased 0.1 dL/g more than that of the prepolymer, and the intrinsic viscosity can be increased to 1.5 dL/g. Solid phase polymerization can be conducted through condensation of polymerizing chips, powders, fibers, plates or blocks of prepolymer under the presence of an inert gas such as nitrogen and argon or under a vacuum not more than 10 kPa, preferably not more than 1 kPa, at a temperature of 190 to 250° C. for 1 to 70 hours.

The thus obtained polyalkylene terephthalate also can be used as a source material of fibers, films and moldings.

EXAMPLES

In the following, the present invention will be further described in detail by examples. However the present invention is not restricted only to these examples. The main measured values which are used in the examples of the present invention were measured by the following method of measurement.

(1) Measurement of the Light Transmittance of Titanium Oxide Sol:

The concentration of the titanium oxide was adjusted to 0.7 g/L by a used dispersion medium (for example, ethylene glycol in example 1), a cell having optical path length of 1 cm was used and the light transmittance was measured in the wavelength range of 400 to 800 nm by using a spectrophotometer "UV-3100 PC" made by Shimadzu Corporation. A light transmittance of the titanium oxide sol was defined by the minimum light transmittance in this range.

(2) The Amount of Hydroxyl Groups on the Surface of Titanium Oxide:

The measurement was conducted by a F ion exchange method. An absorptiometry by coloring was applied to the determination of F ion.

(A) Measuring Method:

1. A buffer solution was adjusted so that acetic acid was 1N and sodium acetate was 0.5N and the buffer solution was 10-fold diluted. To the diluted buffer solution, 1.68 g per 1 L of NaF was added so that the amount of F ion was 40 mmol/L. This solution was used as an adsorption solution. The initial amount of free F ion (a) (g/L) in the adsorption solution was measured.

2. The concentration of $TiO_2$ in a sample was measured beforehand, a part of the sample was aliquoted to be added to the adsorption solution so that the concentration of $TiO_2$ in the adsorption solution was 4 g/L and the stirring was started at a room temperature. At this time, the total amount of the solution was 250 mL and the solution was used as a test solution. The test solution was continued to be stirred at a room temperature until the end of the measurement.

3. After adding the sample, the amount of free F ion (g/L) of the test solution was measured per hour and the point where the value did not change by reaching the point of adsorption saturation was set as the end point. From the amount of free F ion (b) at the time at which the adsorption was saturated, the amount of hydroxyl groups was calculated by the following formula:

The amount of hydroxyl groups (mmol/g)=((a)−(b))/(18.998×4).

(B) The Measuring Method of F Ion:

1. From the test solution, 100 μL of sample was aliquoted for a measuring flask of 50 mL.

2. 5 mL of 2.5% lanthanum-alizarin complexone solution was added as a color coupler, and water was further added to the marked line of the messed flask and after stirring, it was left to stand for 1 hour.

3. The absorbance was measured by a spectrophotometer, and the amount of F ion was calculated based on a calibration curve.

(3) Intrinsic Viscosity:

The intrinsic viscosity [η] is the value based on the definition of the following formula:

$$[\eta]=\lim_{C\to 0}(\eta r-1)/C,$$

(wherein, ηr in the definition equation is a value which is obtained by dividing a viscosity of PET diluted solution dissolved by 98% purified o-chrolophenol at a temperature of 35° C. by a viscosity of the above-described solvent itself which was measured at the same temperature and which is defined as a relative viscosity. C is the weight of solute by gram in 100 mL of the above-described solution.)

(4) Measurement of the Content of Elements:

The content of elements was measured by using inductively coupled plasma optical emission spectrometry (model: IRIS-AP, made by Thermo Jarrell Ash Co.).

An assay sample was adjusted by the following. To a conical flask, 0.5 g of resin compounds and 15 ml of concentrated sulfuric acid was added and decomposed on a hot plate having a temperature of 150° C. for 3 hours and then on a hot plate having a temperature of 350° C. for 2 hours. After cooling, a solution of 5 ml of hydrogen peroxide was added and after oxidatively decomposed, the resultant solution was concentrated to 5 ml and 5 ml of aqueous solution having concentrated hydrochloric acid and water at a rate of 1:1 was added and 40 ml of water was further added and the resulting mixture was used as an assay sample.

(5) Measurement of L* and b*:

Samples (e.g., pellets) were filled in the cell made of glass (inner diameter 61 mm×depth 30 mm) up to 90 to 100% of the depth of the cell, and L* and b* was measured by using a color difference meter (SM-7-CH) made by Suga Test Instruments Co., Ltd. in the CIE-L*a*b* color system (CIE1976).

(6) Copolymerization Ratio of Diglycol:

After 2 g of a powdered sample was precisely measured, it was added to 25 mL of a solution of 2N potassium hydroxide in methanol and subjected to solvolysis for 4 hours under reflux. Using the obtained decomposition product, the quantity determination was conducted by gas chromatography.

As the column, 30 mm (length)×0.25 mm (inside diameter) (liquid phase film thickness: 0.25 μm) of Durabond DB-Wax (made by J & W Scientific) was used and the measurement was conducted from 150 to 230° C. by flowing Helium at 100 mL/minute at a rising temperature rate of 20° C./minute.

(7) Amount of Terminal Carboxyl Groups:

After 1 g of sample was dissolved into 25 mL of benzyl alcohol, 25 mL of chloroform was added, and then a titer VA (mL) in the 1/50 N of potassium hydroxide/benzyl alcohol and a titer VO in a blank titration without pellet were determined and an amount of terminal carboxyl groups per 1 kg of polymer was calculated depending on the following formula:

Amount of terminal carboxyl groups (milliequivalent/kg polymer)=(VA−VO)×20

(8) Measurement of Specific Surface Area:

It was measured according to the BET method.

(9) Color Fastness:

A color fastness to dry-cleaning was determined according to JIS-L-0860 and color fastness to light was determined according to JIS-L-0842.

Reference Example 1

Dimethyl terephthalate and ethylene glycol used in the examples were those obtained by chemical recycled as follows:

144 parts by weight of PET having intrinsic viscosity 0.7 dL/g, 270 parts by weight of ethylene glycol and 0.144 parts by weight of sodium acetate were reacted at a temperature of 220° C. for 120 minutes. After the reaction, ethylene glycol was distilled off under a vacuum of 160 mmHg.

The obtained residue at a temperature of 140° C. was poured into 100 parts by weight of methanol having a temperature of 25° C. in which 1.92 parts by weight of sodium carbonate was dispersed, and heated at 65° C. for 120 minutes. After the reaction, it was cooled to 20° C. and was left to stand for 30 minutes. Then, it was centrifuged at 1000 rpm and separated into a liquid phase (methanol and ethylene glycol are main components and sodium acetate and sodium carbonate are also included) and solid phase (dimethyl terephthalate is a main component and sodium acetate and sodium carbonate are also included). The liquid phase and the solid phase were separately distilled and ethylene glycol and dimethyl terephthalate were recovered.

Example 1

The titanium oxide concentration (in terms of $TiO_2$) and the sulfuric acid concentration (in terms of $H_2SO_4$) of an aqueous titanyl sulfate solution obtained by dissolving ilmenite ore in sulfuric acid and then removing precipitates were adjusted to 60 g/L and 250 g/L, respectively. To the solution, 200 g/L aqueous sodium hydroxide solution was added to a pH of 7 to precipitate orthotitanic acid. During this process, the liquid temperature was kept at 20° C. to 40° C. The orthotitanic acid in an amount of 5% in terms of titanium oxide was then added to an aqueous titanyl sulfate solution whose titanium oxide concentration was adjusted to 100 g/L and whose sulfuric acid concentration was adjusted to 350 g/L, and the mixture was boiled for 3 hours to carry out hydrolysis. The thus obtained titanium hydroxide slurry was washed with water and the pH thereof was adjusted to 10 with sodium hydroxide, followed by stirring the mixture at 60° C. for 2 hours. After cooling and filtering the mixture, HCl and water were added thereto so as to attain a titanium oxide concentration (in terms of $TiO_2$) of 200 g/L and an HCl concentration of 100 g/L, and the mixture was peptized at 60° C. for 4 hours with stirring. Thereafter, the mixture was subjected to desalination to obtain an aqueous titanium oxide sol having a concentration of 20% by weight in terms of $TiO_2$.

To 100 g of the aqueous titanium oxide sol, 80 g of ethylene glycol was added and mixed, and the mixture was heated under reduced pressure to remove water, thereby to obtain a titanium oxide sol containing ethylene glycol as the solvent (light transmittance: 98%, titanium oxide concentration: 20 g/L, amount of hydroxyl groups: 2.0 mmol per 1 g of titanium oxide).

Example 2

By the same method as in Example 1 except that the amount of the added orthotitanic acid was 15%, a titanium oxide sol containing ethylene glycol as the solvent (light transmittance: 99%, titanium oxide concentration: 21.3 g/L, amount of hydroxyl groups: 2.5 mmol per 1 g of titanium oxide) was obtained.

Comparative Example 1

As in Example 2, the hydrolysis was carried out and the obtained titanium hydroxide slurry was washed with water, followed by drying at 150° C. and pulverization. The specific surface area of the obtained powder was 110 m²/g. The obtained titanium oxide compound was a mixture of titanium hydroxide and titanium oxide. The thus obtained powder was mixed with ethylene glycol and dispersed in ethylene glycol with a beads mill to obtain a titanium oxide dispersion (light transmittance 60%, titanium oxide concentration 20.0 g/L and the amount of hydroxyl groups of 0.4 mmol per 1 g of titanium oxide).

Example 3

Bis(2-hydroxyethyl)terephthalate (BHET) was produced by an ester exchange reaction at a temperature of 220° C. using 1300 parts by weight of dimethyl terephthalate, 872 parts by weight of ethylene glycol, and as a transesterification catalyst, 1.2 parts by weight of calcium acetate hydrated. To the obtained BHET, 0.4 parts by weight of trimethyl phosphate and, as a polycondensation catalyst, 0.06 parts by weight of titanium oxide sol (in terms of $TiO_2$) of Example 1 were added. Then the temperature was elevated and maintained at 230 to 240° C. for 45 minutes. During that time, the pressure was decreased from the normal pressure to 0.3 kPa and finally to 0.09 kPa while distilling off ethylene glycol. Then, the temperature was elevated to 290° C. and polycondensation was conducted for about 3 hours. The obtained PET was discharged into water from a round spinneret having a diameter of 10 mm and solidified. The properties of the obtained polymer are shown in table 1.

Example 4

PET was produced by the same method as Example 3 except that the titanium oxide sol of Example 2 was used as a polycondensation catalyst. The properties of the obtained polymer are shown in table 1.

Comparative Example 2

PET was produced by the same method as Example 3 except that titanium oxide ethylene glycol dispersions of comparative Example 1 was used as the polycondensation catalyst. The properties of the obtained polymer are shown in Table 1.

Comparative Example 3

BHET was produced by an ester exchange reaction at a temperature of 220° C. using 1300 parts by weight of dimethyl terephthalate, 872 parts by weight of ethylene glycol and, as a transesterification catalyst, 1.2 parts by weight of calcium acetate hydrated. To the obtained BHET, 0.45 parts by weight of trimethyl phosphate and, as a polycondensation catalyst, 0.65 parts by weight of antimony trioxide. Then the temperature was elevated and maintained at 230 to 240° C. for 45 minutes. During that time, the pressure was decreased from the normal pressure to 0.3 kPa and finally to 0.09 kPa while distilling off ethylene glycol. Then, the temperature was elevated to 285° C. and polycondensation was conducted for about 2 hours and 40 minutes. The obtained PET was discharged into water from round spinneret having a diameter of 10 mm and solidified. The properties of the obtained polymer are shown in table 1.

Example 5

Bis(2-hydroxyethyl)terephthalate (BHET) was produced by an ester exchange reaction at a temperature of 220° C. using 1300 parts by weight of dimethyl terephthalate, 872 parts by weight of ethylene glycol, and as a transesterification catalyst and a polycondensation catalyst, 0.06 parts by weight of titanium oxide sol (in terms of $TiO_2$) of Example 1. To the obtained BHET, 0.4 parts by weight of trimethyl phosphate and 0.5 parts by weight of pentaerythritol tetrakis [3-(3,5-ditert-butyl-4-hydroxyphenyl)propionate] were added. Then the temperature was elevated and maintained at 230 to 240° C. for 45 minutes. During that time, the pressure was decreased from normal pressure to 0.3 kPa and finally to 0.09 kPa while distilling off ethylene glycol. Then, the temperature was elevated to 290° C. and polycondensation was conducted for about 3 hours. The obtained PET was discharged into water from a round spinneret having a diameter of 10 mm and solidified. The properties of the obtained polymer are shown in table 1.

The obtained polymer was dried using a circulation type dryer under a nitrogen atmosphere, at a temperature of 160° C., to a moisture regain of 30 ppm. The obtained dried polymer was injected into an extruder and extruded through 36 circular spinning nozzles having a diameter of 0.23 mm at a temperature of 290° C. Cool air having a temperature of 20° C. and a relative humidity of 90% was blown at a rate of 0.4 m/s onto a group of filaments and the filaments were solidified. A finishing agent having aliphatic series ester as a major component in a form of water-dispersed emulsion having a concentration of 10% was attached to a group of solidified filaments and wound up at a rate of 1600 m/min. Then, the obtained undrawn yarns were drawn by passing them through a hot plate having a temperature of 70° C., then through a hot plate having a temperature of 160° C. so that the elongation was about 25% and the drawn yarn having 57 dtex/36 filaments was obtained. The strength was 4.7 cN/dtex and the elongation was 25%.

After continuing spinning for a week, stain on the spinning nozzle was not recognized.

The obtained drawn yarns were cylindrically woven and subjected to dry-heat-set at a temperature of 160° C. for a minute. Then, they were dyed using 8% omf of Dianics Black BG-FS (made by DyStar Japan Ltd.), under the existence of Niccasan Salt 1200, which was a dyeing auxiliary, at a concentration of 0.5 g/liter, at a liquor ratio of 1:30, at a temperature of 120° C. and for 60 minutes, while adjusting to have pH of 6 by acetic acid. The obtained dye goods obviously excelled in brightness as compared to the dyed fiber obtained by using the polymer obtained in comparative Example 3.

When the woven cylinder was subjected to alkali weight reduction with 1N of aqueous sodium hydroxide for 30 minutes and dyed in the same way, the development of black was quite clear and deep. Such a depth could not be obtained in the fiber using the polymer obtained in comparative Example 3.

Example 6

Bis(2-hydroxyethyl)terephthalate (BHET) was produced by an ester exchange reaction at a temperature of 220° C. using 1300 parts by weight of dimethyl terephthalate, 872 parts by weight of ethylene glycol and, as a transesterification catalyst and a polycondensation catalyst, 0.06 parts by weight of titanium oxide sol (in terms of $TiO_2$) of Example 1. To the obtained BHET, 0.4 parts by weight of trimethyl phosphate was added. Then the temperature was continued to be elevated and was maintained at 230 to 240° C. for 45 minutes. During that time, the pressure was decreased from the normal pressure to 0.3 kPa and finally to 0.09 kPa while distilling off ethylene glycol. Then, the temperature was continued to be elevated to 250° C. and polycondensation was conducted for about 3 hours. The obtained PET was discharged into water from round spinneret having a diameter of 10 mm and solidified. The properties of the obtained polymer are shown in table 1.

Example 7

Titanium oxide sol was produced by the same method as Example 1 except that 1,4-butanediol was used instead of ethylene glycol as a dispersion medium. The obtained titanium oxide sol had a light transmittance of 98%, a titanium oxide concentration of 20 g/L and 2.0 mmol of hydroxyl groups per 1 g of titanium oxide.

Polyalkylene terephthalate polymer was produced by the same method as Example 6 except that the above-described titanium oxide sol was used as a catalyst titanium oxide sol and that 1,4-butanediol was used instead of ethylene glycol. The properties of obtained polymer are shown in table 1.

Example 8

Titanium oxide sol was produced by the same method as Example 1, except that silicon tetrachloride was added to titanyl sulfate so that an amount of silicone element corresponded to 10 mol % of titanium element. The obtained titanium oxide sol had a light transmittance of 98%, a titanium oxide concentration of 22 g/L, a silicon oxide concentration of 2 g/L and 2.1 mmol of hydroxyl groups per 1 g of the whole oxide.

Example 9

Titanium oxide sol was produced by the same method as Example 1, except that silicon tetrachloride and zirconium tetrachloride are added so that the amount of silicon element and zirconium element correspond to 5% mol of titanium element, respectively. The obtained titanium oxide sol had a light transmittance of 98%, a titanium oxide concentration of 18 g/L, a silicon oxide concentration of 2 g/L, zirconium oxide concentration of 2 g/L and 2.1 mmol of hydroxyl groups per 1 g of the whole oxide.

Example 10

PET was produced by the same method as Example 3, except that the titanium oxide sol of Example 8 was used as a polycondensation catalyst. The properties of obtained polymer are shown in table 1.

Example 11

PET was produced by the same method as Example 3, except that the titanium oxide sol of Example 9 was used as a polycondensation catalyst. The properties of obtained polymer are shown in table 1.

Example 12

The obtained PET chips after the reaction of polycondensation in Example 5 were subjected to a solid phase polymerization under a nitrogen atmosphere at a temperature of 220° C. for 30 hours. The properties of obtained polymer are shown in table 1.

Example 13

Titanium oxide sol was produced by the same method as Example 1, except that 1,3-propanediol was used instead of ethylene glycol as a dispersion medium. The obtained titanium oxide sol had a light transmittance of 98%, a titanium oxide concentration of 20 g/L and 2 mmol of hydroxyl groups per 1 g of titanium oxide.

Then, bis(3-hydroxypropyl)terephthalate (BHPT) was produced by an ester exchange reaction at a temperature of 220° C. using 1300 parts by weight of dimethyl terephthalate, 1370 parts by weight of 1,3-propanediol and, as a transesterification catalyst and a polycondensation catalyst, 0.06 parts by weight of the above-described titanium oxide sol (in terms of $TiO_2$). To the obtained BHPT, 0.4 parts by weight of trimethyl phosphate was added. Then the temperature was elevated and maintained at 230 to 240° C. for 45 minutes. During that time, the pressure was decreased from normal pressure to 0.3 kPa and finally to 0.09 kPa while distilling off 1,3-propanediol. Then, the temperature was elevated to 250° C. and polycondensation was conducted for about 3 hours.

The properties of obtained polymer are shown in table 1.

Example 14

Bis(4-hydroxybutyl)terephthalate (BHBT) was produced by an ester exchange reaction at a temperature of 220° C. using 1300 parts by weight of dimethyl terephthalate, 1370 parts by weight of 1,4-butanediol and, as a transesterification catalyst and a polycondensation catalyst, 0.06 parts by weight of the titanium oxide sol (in terms of $TiO_2$) which was produced in Example 7. To the obtained BHBT, 0.4 parts by weight of trimethyl phosphate was added. Then the temperature was elevated and was maintained at 230 to 240° C. for 45 minutes. During that time, the pressure was decreased from normal pressure to 0.3 kPa and finally to 0.09 kPa while distilling off 1,4-butanediol. Then, the temperature was elevated to 250° C. and polycondensation was conducted for about 3 hours.

The properties of obtained polymer are shown in table 1.

Example 15

The titanium oxide concentration (in terms of $TiO_2$) and the sulfuric acid concentration (in terms of $H_2SO_4$) of an aqueous titanyl sulfate solution obtained by dissolving ilmenite ore in sulfuric acid and then removing precipitates were adjusted to 60 g/L and 250 g/L, respectively. To the solution, 200 g/L aqueous sodium hydroxide solution was added to a pH of 7 to precipitate metatitanic acid. During this process, the liquid temperature was kept at 20° C. to 40° C. The metatitanic acid in an amount of 5% in terms of titanium oxide was then added to an aqueous titanyl sulfate solution whose titanium oxide concentration was adjusted to 100 g/L and whose sulfuric acid concentration was adjusted to 450 g/L, and the mixture was boiled for 3 hours to carry out hydrolysis. The thus obtained titanium hydroxide slurry was washed with water and the pH thereof was adjusted to 10 with sodium hydroxide, followed by stirring the mixture at 60° C. for 2 hours. After cooling and filtering the mixture, HCl and water were added thereto so as to attain a titanium oxide concentration (in terms of $TiO_2$) of 200 g/L and an HCl concentration of 200 g/L, and the mixture was peptized at 60° C. for 34 hours with stirring. Thereafter, the mixture was subjected to desalination to obtain an aqueous titanium oxide sol having a concentration of 20% by weight in terms of $TiO_2$.

To 100 g of the aqueous titanium oxide sol, 80 g of ethylene glycol was added and mixed, and the mixture was heated under reduced pressure to remove water, thereby obtaining a titanium oxide sol containing ethylene glycol as the dispersion medium (light transmittance: 70%, titanium oxide concentration: 20 g/L, amount of hydroxyl groups: 14 mmol per 1 g of titanium oxide).

Example 16

Titanium oxide sol was produced by the same method as Example 1, except that zinc chloride and germanium tetrachloride are added so that the amount of zinc element and germanium element correspond to 5 atomic % of titanium element, respectively. The obtained titanium oxide sol had a light transmittance of 98%, a titanium oxide concentration of 18 g/L, a zinc oxide concentration of 2 g/L, germanium oxide concentration of 2 g/L and 9.0 mmol of hydroxyl groups per 1 g of the whole oxide.

Example 17

PET was produced by the same method as Example 3, except that the titanium oxide sol obtained in Example 15 is used as an ester exchange catalyst and polycondensation catalyst and that the polycondensation was conducted for 1.2 hours. The properties of obtained polymer are shown in table 1.

Example 18

PET was produced by the same method as Example 3, except that the titanium oxide sol obtained in Example 16 is used as an ester exchange catalyst and polycondensation catalyst. The properties of the obtained polymer are shown in table 1.

TABLE 1

| | Catalyst | | | Amount of COOH | Glycol | | |
|---|---|---|---|---|---|---|---|
| | Ester Exchange Reaction | Polycondensation Reaction | [η] (dl/g) | (milliequivalent/ kg) | Copolymerization Ratio (wt %) | L* | b* |
| Example 3 | Calcium Acetate | Sol of Example 1 | 0.62 | 24 | 0.73 | 90.4 | 8.4 |
| Example 4 | Calcium Acetate | Sol of Example 2 | 0.63 | 26 | 0.62 | 90.7 | 8.9 |

TABLE 1-continued

| | Catalyst | | | Amount of COOH | Glycol | | |
|---|---|---|---|---|---|---|---|
| | Ester Exchange Reaction | Poly-condensation Reaction | [η] (dl/g) | (milli-equivalent/ kg) | Copoly-merization Ratio (wt %) | L* | b* |
| Comparative Example 2 | Calcium Acetate | Dispersion of Comparative Example 1 | 0.52 | 34 | 0.18 | 81.4 | 16.8 |
| Comparative Example 3 | Calcium Acetate | Antimony Trioxide | 0.62 | 28 | 0.72 | 79.4 | 8.6 |
| Example 5 | Sol of Example 1 | Sol of Example 1 | 0.65 | 25 | 0.86 | 88.6 | 8.5 |
| Example 6 | Sol of Example 1 | Sol of Example 1 | 0.90 | 27 | 0.74 | 90.5 | 8.1 |
| Example 7 | Sol of Example 7 | Sol of Example 7 | 1.07 | 25 | 0.78 | 91.0 | 6.5 |
| Example 10 | Calcium Acetate | Sol of Example 8 | 0.62 | 23 | 0.74 | 90.0 | 8.0 |
| Example 11 | Calcium Acetate | Sol of Example 9 | 0.63 | 23 | 0.78 | 90.2 | 8.1 |
| Example 12 | Sol of Example 1 | Sol of Example 1 | 1.30 | 12 | 0.79 | 90.0 | 8.3 |
| Example 13 | Sol of Example 13 | Sol of Example 13 | 0.92 | 25 | 0.92 | 90.0 | 8.4 |
| Example 14 | Sol of Example 7 | Sol of Example 7 | 1.01 | 24 | 1.02 | 90.0 | 5.3 |
| Example 17 | Sol of Example 15 | Sol of Example 15 | 0.63 | 25 | 1.02 | 88.0 | 11.5 |
| Example 18 | Sol of Example 16 | Sol of Example 16 | 0.62 | 23 | 1.06 | 89.2 | 9.8 |

INDUSTRIAL APPLICABILITY

Inventive titanium oxide sol is preferably used as a polymerization catalyst for polyalkylene terephthalate. The obtained polyalkylene terephthalate is environmentally friendly and useful as a source material of a fiber, a resin, a film and the like.

The invention claimed is:

1. A titanium oxide sol for a catalyst for polymerizing a polyalkylene terephthalate, wherein the sol contains an organic solvent as a dispersion medium, the sol has a light transmittance of not less than 50%, the light transmittance being measured by adjusting a concentration of the titanium oxide in the sol to 0.7 g/L and setting an optical path length to 1 cm in a wavelength range of 400 to 800 nm, and the amount of hydroxyl groups per 1 g of titanium oxide is not less than 1.8 mmol.

2. The titanium oxide sol according to claim 1, wherein the light transmittance is not less than 90%.

3. The titanium oxide sol according to claim 1, wherein the organic solvent is a glycol.

4. The titanium oxide sol according to claim 1, wherein 1 to 50 mol % of titanium element in the titanium oxide is substituted by an element(s) other than titanium element.

5. The titanium oxide sol according to claim 4, wherein the element(s) other than the titanium element is at least one selected from the group consisting of silicon, zirconium, zinc and germanium.

* * * * *